(12) United States Patent
Ang et al.

(10) Patent No.: US 11,592,687 B2
(45) Date of Patent: Feb. 28, 2023

(54) METHOD FOR DETERMINING AN OPHTHALMIC LENS AND ASSOCIATED OPHTHALMIC LENS

(71) Applicant: ESSILOR INTERNATIONAL, Charenton-le-Pont (FR)

(72) Inventors: Ker Chin Ang, Singapore (SG); Paulyn Ng, Singapore (SG); Valérie Parmentier, Ruiel Malmaison (FR); Bernard Bourdoncle, Paris (FR); Anne-Catherine Scherlen, Paris (FR)

(73) Assignee: Essilor International, Charenton-le-Pont (FR)

( * ) Notice: Subject to any disclaimer, the term of this patent is extended or adjusted under 35 U.S.C. 154(b) by 879 days.

(21) Appl. No.: 16/347,334

(22) PCT Filed: Oct. 27, 2017

(86) PCT No.: PCT/EP2017/077645
§ 371 (c)(1),
(2) Date: May 3, 2019

(87) PCT Pub. No.: WO2018/083038
PCT Pub. Date: May 11, 2018

(65) Prior Publication Data
US 2019/0278108 A1 Sep. 12, 2019

(30) Foreign Application Priority Data
Nov. 3, 2016 (EP) .................................... 16306442

(51) Int. Cl.
*G02C 7/10* (2006.01)
*G02C 7/02* (2006.01)

(52) U.S. Cl.
CPC ............. *G02C 7/105* (2013.01); *G02C 7/025* (2013.01); *G02C 7/027* (2013.01)

(58) Field of Classification Search
CPC ......... G02C 7/105; G02C 7/025; G02C 7/027
See application file for complete search history.

(56) References Cited

U.S. PATENT DOCUMENTS

2019/0011731 A1* 1/2019 Teodorovic ............ H04N 7/183

FOREIGN PATENT DOCUMENTS

| CN | 105874376 | 8/2016 |
|---|---|---|
| CN | 106030382 | 10/2016 |
| FR | 2684771 | 6/1993 |
| FR | 2908899 | 5/2008 |
| WO | WO 01/46747 | 6/2001 |
| WO | WO 2007/142794 | 12/2007 |
| WO | WO 2008/059176 | 5/2008 |
| WO | WO 2016/113506 | 7/2016 |

OTHER PUBLICATIONS

International Search Report and Written Opinion issued in International Patent Application No. PCT/EP2017/077645, dated Jan. 17, 2018.

* cited by examiner

*Primary Examiner* — James C. Jones
(74) *Attorney, Agent, or Firm* — Norton Rose Fulbright US LLP

(57) ABSTRACT

A method for determining an ophthalmic lens (1) for a wearer with a personalized light-filter pattern (3) defined by pattern parameters, wherein the method comprises collecting data relating to the wearer and determining the pattern parameters based on the data relating to the wearer.

13 Claims, 5 Drawing Sheets

METHOD FOR DETERMINING AN OPHTHALMIC LENS AND ASSOCIATED OPHTHALMIC LENS

CROSS-REFERENCE TO RELATED APPLICATIONS

This application is a national phase application under 35 U.S.C. § 371 of International Application No. PCT/EP2017/077645 filed 27 Oct. 2017, which claims priority to European Patent Application No. 16306442.1 filed 3 Nov. 2016. The entire contents of each of the above-referenced disclosures is specifically incorporated by reference herein without disclaimer.

FIELD OF THE INVENTION

The present invention relates to a method for determining an ophthalmic lens for a wearer with a personalized light-filter pattern and to an ophthalmic lens with a personalized light-filter pattern.

BACKGROUND OF THE INVENTION

Light filters like sunglasses or uniformly tinted glasses are used to improve the visual comfort of the wearer in a particular situation, for example while performing sunny outdoor activities, working in front of a computer or watching TV. These light filters are usually coated layers on an ophthalmic lens to filter off harmful ultraviolet light, high-energy visible light and/or infrared light.

To improve the wearer's visual comfort, more complex filters are used. The visual comfort may be improved by introducing light-filtering zones at different positions on the ophthalmic lens, the light-filtering zones modifying the optical properties of the light coming through the ophthalmic lens up to the wearer's eye, when the wearer is looking in a particular direction depending on the activity of the wearer.

In some cases, the light filters are dynamic filters comprising a layer of liquid crystal over the whole surface of the ophthalmic lens and capable of darkening on parts of the ophthalmic lens where the user is experiencing glare from bright sun or lights without dimming the rest thereof.

In other cases, the filter is more complex and adapted for particular activities such as piloting an airplane, outdoor activities such as fishing, golfing and hunting, driving at night, protection against blue light, etc.

However, the light-filter patterns of the prior art are usually designed based on data relating to a reference population and/or for a limited set of situations so that these light-filter patterns may not be adapted to the wearer, or for the specific activity and/or to the environment in which the ophthalmic lens with the light-filter pattern will be used, resulting in visual discomfort.

SUMMARY OF THE INVENTION

Thus, it is an aim of the present invention to provide a method for determining an ophthalmic lens with a light-filter pattern personalized to the wearer's needs and an ophthalmic lens with a light-filter pattern personalized to the wearer's needs.

To this end, the present invention provides, according to a first aspect, a method for determining an ophthalmic lens for a wearer with a personalized light-filter pattern defined by pattern parameters. The method comprises collecting data relating to the wearer and determining the pattern parameters based on the data relating to the wearer, wherein collecting data relating to the wearer and determining the pattern parameters comprises one or more of the following:

(a) measuring sensitivity data on the wearer to at least one part of the optical radiation spectrum and determining the pattern parameters comprises determining the optical properties based on the sensitivity data, (b) obtaining preferred data from the wearer, and determining the pattern parameters is at least partially based on the preferred data, (c) measuring light data corresponding to the light received by the wearer in the given situation, and determining the pattern parameters is at least partially based on light data, (d) measuring at least one biological feature data of an eye of the wearer—preferably at least one of macular size, pupil size and pupil distance—, and determining the pattern parameters is at least partially based on the at least one biological feature data, (e) measuring at least one frame wearing habit data of the wearer—preferably at least one of a vertex distance, a pantoscopic tilt and a wrap angle of the frame—, and determining the pattern parameters is at least partially based on the at least one frame wearing habit data.

Any combination of (a) to (e) is contemplated: only one of them [(a), (b), (c), (d), or (e)]; two of them [(a)+(b), (a)+(c), (a)+(d), (a)+(e), (b)+(c), (b)+(d), (b)+(e), (c)+(d), (c)+(e), or (d)+(e)]; three of them [(a)+(b)+(c), (a)+(b)+(d), (a)+(b)+(e), (a)+(c)+(d), (a)+(c)+(e), (a)+(d)+(e), (b)+(c)+(d), (b)+(c)+(e), (b)+(d)+(e), or (c)+(d)+(e)]; four of them [(a)+(b)+(c)+(d), (a)+(b)+(c)+(e), (a)+(b)+(d)+(e), (a)+(c)+(d)+(e), or (b)+(c)+(d)+(e)]; five of them [(a)+(b)+(c)+(d)+(e)].

Thus, the personalized light-filter pattern may be customized to take into account data relating to the wearer which are normally not taken into account by the methods of the prior art, which on contrary rely on data relating to a standard population and/or are adapted for a limited set of situations. For instance, the wearer might need an ophthalmic lens having a light-filter pattern that is better suited for performing a particular activity such as driving a car or reading, for example, in particular lightning conditions. The specificities of the wearer might relate to his physiological characteristics, his visual, postural or oculomotor behavior or some other parameters that should be taken into account when determining a personalized light filter based on the wearer's needs, preferences or characteristics. Thanks to the method of the invention, the personalized light-filter pattern is thus better adapted to the wearer and provides an improved visual comfort.

The method may at least be partially implemented by computer means.

Preferentially, collecting data relating to the wearer comprises measuring data on the wearer and/or obtaining data from the wearer.

Measuring data on the wearer may be measuring one of the light sensitivity, the gaze direction, the frame wearing habits, the biological features of the wearer and combination thereof, for example.

The data obtained from the wearer may be preferences of the wearer obtained by submitting, for example, different pattern parameters to the appreciation of the wearer by means of a test of one or more lenses having different pattern parameters or by simulating the different pattern obtained from the pattern parameters using a virtual reality headset in the situation for which the light-filter pattern is designed.

The wearer may then express a preference for at least one of the pattern parameters, like the position of the light-filtering zones or the optical properties, or for a particular personalized filter pattern. The virtual reality headset may also be used to simulate one or more particular environments in which the ophthalmic lens is intended to be used.

The data obtained from the wearer may also result from a questionnaire enabling to define the wearer's need, preferences or characteristics.

Preferentially, the personalized light-filter pattern occupies an area which is smaller than the ophthalmic lens' size.

Thus, the personalized filter pattern is adapted for modifying the optical properties of at least one particular area of the ophthalmic lens and not of the whole ophthalmic lens.

The personalized light-filter pattern may comprise at least one light-filtering zone, and the pattern parameters comprise at least one of the position, the shape, the size, and the optical properties of the at least one light-filtering zone.

The position, the shape and the size of the light-filtering zones may also influence the efficiency of the light-filter pattern perceptible by the wearer. The light-filter pattern may also comprise one or more light-filtering zones. When the light-filtering zones have different properties, they may be separated from each other or overlap each other.

The data relating to the wearer may comprise at least one of data relating to the behavior of the wearer during a given activity, data relating to the wearer's preferences and data relating to the environment of the wearer.

The data relating to the behavior of the wearer during a given activity may be a visual behavior, a postural behavior and/or an oculomotor behavior. The visual behavior concerns the eye orientations of the wearer as well as a sensitivity of the wearer to light intensity, to particular light spatial distributions and/or to particular temporal aspects, for example. The oculomotor behavior concerns the eye movements.

The data relating to the wearer's preferences may be obtained from a questionnaire or from a test of one or more lenses having different pattern parameters or by simulating the different pattern obtained from the pattern parameters using a virtual reality headset in the situation for which the light-filter pattern is designed.

The data relating to the environment of the wearer may be additional information regarding the lighting conditions during which the activity is performed or information relative to how the activity is performed. For example, when the activity of the wearer is reading, the wearer may be reading a newspaper or his smartphone, in which case different pattern parameters may be considered.

The sensitivity of the wearer to light intensity may be measured on at least one part of the optical radiation spectrum, which includes the full visible spectrum radiations, the ultraviolet (UV-A, UV-B and UV-C) radiations and the infrared radiations. In a more general manner, the sensitivity to light intensity may be measured for specific wavelengths that are visible to the human eye and/or that can affect the human eye. The sensitivity to light intensity may also be measured without any distinction on the wavelength received by the human eye.

The sensitivity data measured on the wearer may also be a sensitivity of the wearer to particular light spatial distributions and/or to particular temporal aspects like light transitions. Light spatial distribution relates to how light is distributed throughout the scene observed by the wearer when using the ophthalmic lens. For example, when reading, the wearer may only light a lamp positioned close to the position of the wearer without lighting the entire room so that the farther one stands from the lamp the darker it becomes (if the room is empty). Temporal aspect, like light transitions, relates to how light changes over a lapse of time. For example, when driving the wearer might need to go through a tunnel so that he goes from bright day light to dim artificial light.

Based on these measurements, the optical properties of at least one light-filtering zone of the light-filter pattern may be determined and are thus adapted to the specificities of the wearer.

The preferred data may be obtained by submitting, for example, different pattern parameters to the appreciation of the wearer by means of a test of one or more lenses having different pattern obtained from the light pattern parameters or by simulating the different pattern parameters using a virtual reality headset. The wearer may then express a preference for at least one of the pattern parameters, like the position of the light-filtering zones or the optical properties, or for a particular personalized filter pattern. The virtual reality headset may also be used to simulate one or more particular environments in which the ophthalmic lens is intended to be used. For example, the virtual reality headset may be used to simulate an environment is which particular light spatial transitions are represented and the preferences of the wearer for one of the pattern parameters or for a particular personalized filter pattern enables to determine a personalized light-filter pattern that is adapted to the wearer's sensitivity to light spatial transitions.

The optical properties may include at least one of light transmission, light absorption, light reflection and light polarization over at least one part of the optical radiation spectrum.

Thus, the light transmission, absorption, reflection or polarization may be a global parameter or a parameter dependent on the wavelength.

The pattern parameters may comprise at least one of position, shape and size of the at least one zone of the personalized light-filter pattern. In this case, collecting data relating to the wearer may comprise measuring gaze direction data of the wearer when the wearer is looking at a scene in a given situation and determining the pattern parameters comprises determining the at least one of position, shape and size of the at least one zone from the gaze direction data.

By measuring the gaze direction of the wearer, the intersection between the gaze direction and a surface of the ophthalmic lens may be determined and may be used to determine one of the position, shape and/or size of at least one light-filtering zone of the light-filter pattern or a combination thereof. For example, when the wearer is looking at a specific zone of a scene representative of the situation in which the ophthalmic lens will be used, his eye looks at different directions around a main gaze direction according to the oculomotor behavior of the eye of the wearer. Thus, a distribution of gaze directions corresponding to a specific zone of the scene may be measured. Based on that distribution, the intersections of the gaze directions with a surface of the ophthalmic lens may be determined. This corresponds to a projection of the measured gaze direction data on a surface of the ophthalmic lens. Based on the intersections of the gaze direction data with a surface of the ophthalmic lens, some of the parameters of the corresponding light-filtering zone may be determined, such as the size, position and shape of the light-filtering zone. It might be noted that the specific zones of the scene may be dependent on the activity or the environment considered.

In the case of a virtual scene, the virtual scene may be representative of the given situation and measuring gaze direction may comprise displaying the virtual scene on a displayer for the wearer to look at. For example, the virtual scene may be displayed using a virtual reality headset or more commonly on a screen.

In the case of a real scene, measuring gaze direction may comprise placing the wearer in the given situation before the real scene.

In the context of the present invention, the expression "a given situation" refers to a situation that is representative of an activity of the wearer when the wearer uses the ophthalmic lens, and/or the environment in which the wearer uses the ophthalmic lens.

Measuring gaze direction data may comprise tracking the eye orientations of the wearer in the given situation.

An eye tracking device may be used to track the eye orientations of the wearer and determine the gaze direction of the wearer. The eye tracking device is a device that is configured to follow and measure eye positions and eye movements. It has to be noted that the eye orientations may be measured independently of the posture of the wearer. As discussed earlier, the distribution of the gaze directions may be used to determine the size, shape and/or position of the light-filtering zones by calculating the projection of the gaze directions on a surface of the ophthalmic lens.

Measuring gaze direction data may comprise determining the postural behavior of the wearer.

The postural behavior also influences the zone of the lens used by the wearer while performing a particular activity. The postural behavior of the wearer may be any of the eye and head postural behavior and body position. For example, when reading, if the head is directed downwards, the zone of the lens that is used by the wearer is usually on the lower part of the lens. Thus, at least one light-filtering zone may be set to correspond to this zone. In another example, a senior will not have the same body position as a youngster while performing a particular activity. Thus, the angle and position of the head of the wearer's may have an influence on the gaze directions of the wearer and, as a consequence, on the zone of the ophthalmic lens that is used while performing the activity or a particular task part of the activity. Particularly, the position of the light-filtering zones may be determined by measuring the postural behavior of the wearer.

Preferentially, the method further comprises parting the given scene into portions based on lighting conditions of the given situation, and the at least one zone corresponds to the portions of the given scene.

Thus, the different light-filtering zones may be affected with different optical properties adapted to better take into account the lighting conditions of the considered environment. For example, for an ophthalmic lens to be used when driving at sunset, a light-filtering zone (usually central portion of the ophthalmic lens) may be dedicated to attenuating the glare or the light coming from the sun at sunset, a light-filtering zone (usually lower portion) may be dedicated to improving the contrast when reading the car's display and another light-filtering zone (usually upper portion) may be dedicated to attenuating light coming from other cars when the driver is looking at the rear mirror.

Measuring the amount of light that is received by the wearer enables to better adapt the pattern parameters, such as the optical properties or the size of the light-filtering zones, to the lightning conditions specific to the considered environment and thus to improve the visual comfort of the wearer. The optical properties or the size of the light-filtering zones may be modified so that the amount of light going through the ophthalmic lens does not exceed a given value.

Taking into account the morphology of the wearer also enables to better adapt the pattern parameters to the wearer. For example, when the pupil size of the wearer is large, it may be appropriate to provide a light-filter pattern in which the size of the different light-filtering zones is increased in comparison with a standard wearer to ensure that all the light passing through the pupil has met the light-filtering zones. That way, the light-filter pattern will provide the light filtering effect to the wearer more efficiently. Other parameters such as the macular size and the distance of the pupil to the ophthalmic lens may have a similar effect.

The frame wearing habits of the wearer may also be considered in the determination of the pattern parameters. For example, the pantoscopic angle, the wrap angle and/or the vertex distance might also have an influence on the position and/or orientation of the ophthalmic lens relative to the eye of the wearer and thus on the pattern parameters. For example, for a given size of the light-filtering zones, when the vertex distance, i.e. the distance of the eye to the ophthalmic lens, increases, the amount of filtered light reaching the eye lens from a given source of light in front of the wearer decreases. Thus, it may be interesting to adapt the size or the optical properties of the light-filtering zones to take into account the amount of light reaching the eye in that configuration.

The pattern parameters determined based on the at least one frame habit data or the at least one biological feature data may be the size of the at least one light-filtering zone.

Modifying the size of the light-filtering zones is of particular interest as it influences the efficacy of the light filtering effect. For example, if the size of the at least one light-filtering zone is too small, part of the light will not be filtered. It may also be interesting to limit the size of the at least one light-filtering zone, so that enough space is available on the ophthalmic lens to place other light-filtering zones.

The method may further comprise generating a primary light-filter pattern with primary pattern parameters based on a type of ophthalmic lens and a given situation representative of an activity of the wearer when the wearer uses the ophthalmic lens, and/or the environment in which the wearer uses the ophthalmic lens and wearer's prescription if applicable. In such case, determining the personalized light-filter pattern may comprise modifying the primary pattern parameters based on the data relating to the wearer.

Some initial values for the pattern parameters may be set such as the number of zones and the approximate position and size as well as basic optical properties based on the considered situation. Taking into account the type of ophthalmic lens enables to identify the specific zones of the lens like the near field zone for a short vision lens, the near field zone, the far field zone and the transition zone—if needed—for the progressive lenses. The specific zones may be used to roughly set the position of the light-filtering zones depending on the activity and/or the considered environment. These values may be modified using the data relative to the wearer to personalize the light-filter pattern.

Preferentially, generating a primary light-filter pattern comprises selecting a type of ophthalmic lens defined by at least one of the correction properties, the basic intended purpose and the type of frame. The correction properties may be chosen amongst: no correction, short vision correction, far vision correction and progressive correction. The basic intended purpose may be chosen amongst clear vision or solar use. The type of frame may be chosen amongst: rimless, half-rimmed, full-rimmed.

The type of ophthalmic lens may be selected to take into account the type of correction, if any, the type of glass, such as transparent or tinted, and an indication on the size of the ophthalmic lens.

Preferentially, the type of ophthalmic lens is further defined by at least one of a design of the correction properties, a type of tint and a frame size, wherein the type of tint is chosen amongst uniform tint, gradient tint and selective tinting of one or more portions of a lens.

The primary pattern parameters may thus take into account more parameters of the lens to refine the choice of the initial parameters of the pattern filter. For example, when a design of the correction properties is taken into account, the position, size and shape of the primary light-filtering zones may be set more precisely. The type of tint may also be taken into account while determining the initial optical properties of the light-filtering zones.

The method for determining an ophthalmic lens for a wearer with a personalized light-filter pattern defined by pattern parameters may further comprise editing a light-filter pattern prescription based on the pattern parameters.

The light-filter pattern prescription is thus adapted to the wearer.

According to another aspect, the present invention concerns a method for manufacturing an ophthalmic lens with a personalized light-filter pattern comprising manufacturing the ophthalmic lens based on the light-filter pattern prescription edited previously.

The personalized light-filter pattern may be used to manufacture the personalized light-filter pattern.

According to another aspect, the present invention concerns a computer program, for example a non-transitory computer program, comprising one or more stored sequence/s of instructions that is accessible to a processor and which, when executed by the processor, causes the processor to carry out at least one of the steps consisting of collecting data relating to the wearer and/or determining the pattern parameters based on the data relating to the wearer of the method for determining an ophthalmic lens for a wearer with a personalized light-filter pattern.

A non-transitory computer readable medium carrying out one or more sequence/s of instructions of the computer program is also provided.

According to another aspect, the present invention concerns an ophthalmic lens comprising a personalized light-filter pattern defined by pattern parameters, wherein the pattern parameters are determined based on data relating to the wearer.

The personalized light-filter pattern may comprise at least one light-filtering zone and the pattern parameters may comprise at least one of the position, the shape, the size, and the optical properties of the at least one light-filtering zone.

The personalized light-filter pattern may occupy an area which is smaller than the ophthalmic lens' size.

The data relating to the wearer may comprise data relating to the behavior of the wearer during a given activity, data relating to the wearer's preferences and data relating to the environment of the wearer.

The data relating to the wearer may be measured on the wearer and/or obtained from the wearer as explained previously.

BRIEF DESCRIPTION OF THE DRAWINGS

Further details, aspects and embodiments of the proposed solution will be described, by way of example only, with reference to the drawings.

DESCRIPTION

Figure 1:
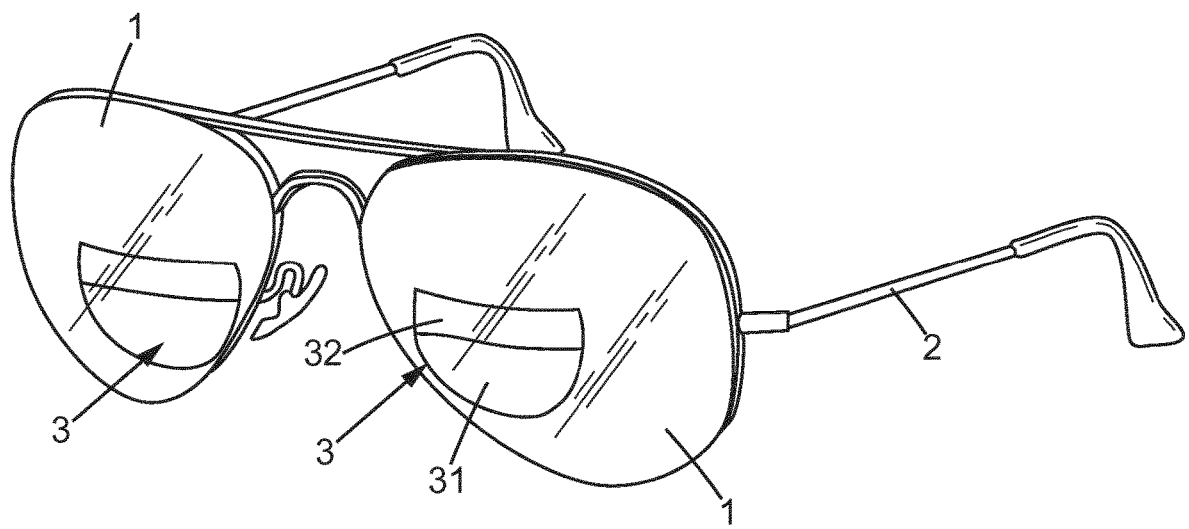
FIG. 1 is an elevation view of an exemplary ophthalmic lens with a light-filter pattern according to the invention.

FIG. 1 shows a pair of ophthalmic lenses 1 mounted on a frame 2. Each of the ophthalmic lenses 1 comprises a personalized light-filter pattern 3 comprising at least one light-filtering zone, the personalized light-filter pattern preferentially occupying an area which is smaller than the ophthalmic lens' size. On FIG. 1, two light-filtering zones 31, 32 are illustrated for each ophthalmic lens 1.

Each light-filtering zone may be defined using different pattern parameters such as the position, the shape, size and optical properties of the light-filtering zone.

The personalized light-filter pattern is designed to improve the visual comfort of the wearer in a given situation, while performing a particular activity, possibly in an environment in which particular lighting conditions are considered. The visual comfort may be improved by introducing light-filtering zones at different positions on the ophthalmic lens, the light-filtering zones modifying the optical properties of the light coming through the ophthalmic lens to the wearer's eye, when the wearer is looking in a particular direction depending on the activity of the wearer and/or the lighting conditions given by the environment.

Each light-filtering zone may be transparent or non-transparent, with a uniform tint or a gradient tint, the color of the tint and the degree of transparency depending on the optical properties of the light-filtering zone. The light-filtering zones may be made of dyes, pigments, colorants, nanostructures enabling for example to modify the spectral transmission, alternating layers of inorganic and organic optical materials forming interferential or dichroic filters. The light-filtering zone may also be polarizing along a specific axis, non-polarizing or having a gradient of polarization, i.e. an axis of polarization that varies depending on the position within the light-filtering zone. In a general manner, the light-filtering zones may be made of any material in which the optical properties, such as light transmission, light absorption, light reflection and/or light polarization, are modified either temporally or permanently, for a part of or the full visible spectrum, the ultraviolet (UV) and/or the near-infrared (NIR) radiations, with wavelengths ranging from 380 to 750 nm, 100 to 400 nm and 700 nm to 1.0 μm, respectively. Thus, light-filtering zones comprising photochromic or electrochromic elements enabling a temporary modification of the optical properties may be considered as well. In a more general manner, it may be said that the optical properties of the light-filtering zones are modified compared to the optical properties of the same ophthalmic lens without the light-filter pattern, preferentially to the part of the ophthalmic lens on which the at least one light-filtering zone is positioned. Further, light-filtering zones may be apart from one another as represented FIG. 1 but may also overlap one another.

A method for determining an ophthalmic lens for a wearer with a personalized light-filter patter according to the invention will now be described with reference to FIGS. 2 to 6.

Figure 2:
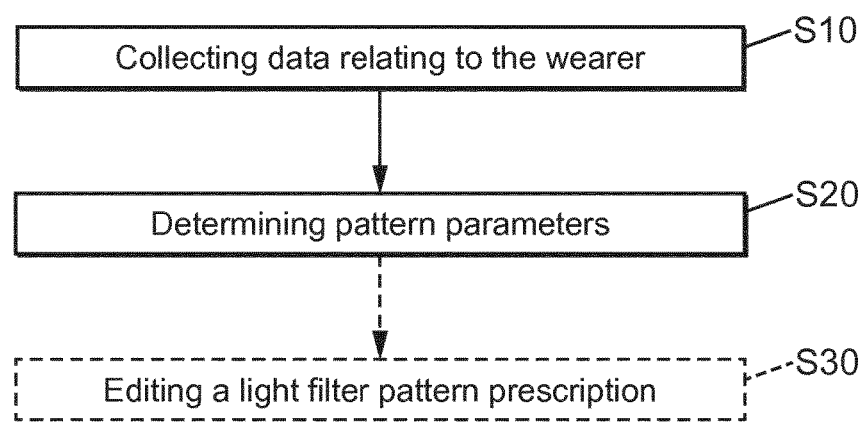
FIG. 2 is a flow chart showing the steps of the method for determining an ophthalmic lens for a wearer with a personalized light-filter pattern, according to the invention.

As shown in FIG. 2, the method of the present invention comprises collecting data relating to the wearer (step S10) and determining the pattern parameters based on the data relating to the wearer (step S20).

The method may further comprise editing a light-filter pattern prescription based on the pattern parameters (step S30). The light-filter pattern prescription comprises information that may be used for manufacturing the ophthalmic lens with the personalized light-filter pattern. For example, the light-filter pattern prescription comprises information about the number, size, shape and position of the light-filtering zones. The light-filter pattern prescription may comprise the values of the optical properties of the light-filtering zones, like the transmission, reflection, absorption and/or orientation of the polarization axis on all or part of the optical radiation spectrum. Based on the light pattern prescription, the ophthalmic lens with the light-filter pattern may be manufactured as described later in reference to FIG. 7.

Collecting data relating to the wearer may comprise measuring data on the wearer and/or obtaining data from the wearer. Furthermore, the data relating to the wearer may comprise data relating to the behavior of the wearer during a given activity, data relating to the wearer's preferences and/or data relating to the environment of the wearer. The data relating to the behavior of the wearer may be a visual behavior, a postural behavior and/or an oculomotor behavior. The visual behavior concerns the eye orientations of the wearer as well as the light sensitivity of the wearer, for example. The oculomotor behavior concerns the eye movements. The data relating to the wearer's preferences may be obtained from a questionnaire or from a test. that will be described with more details later. The data relating to the environment of the wearer may be additional information regarding the lighting conditions during which the activity is performed or information relative to how the activity is performed. For example, when the activity of the wearer is reading, the wearer may be reading a newspaper or his smartphone, in which case different pattern parameters may be considered.

Figure 3:
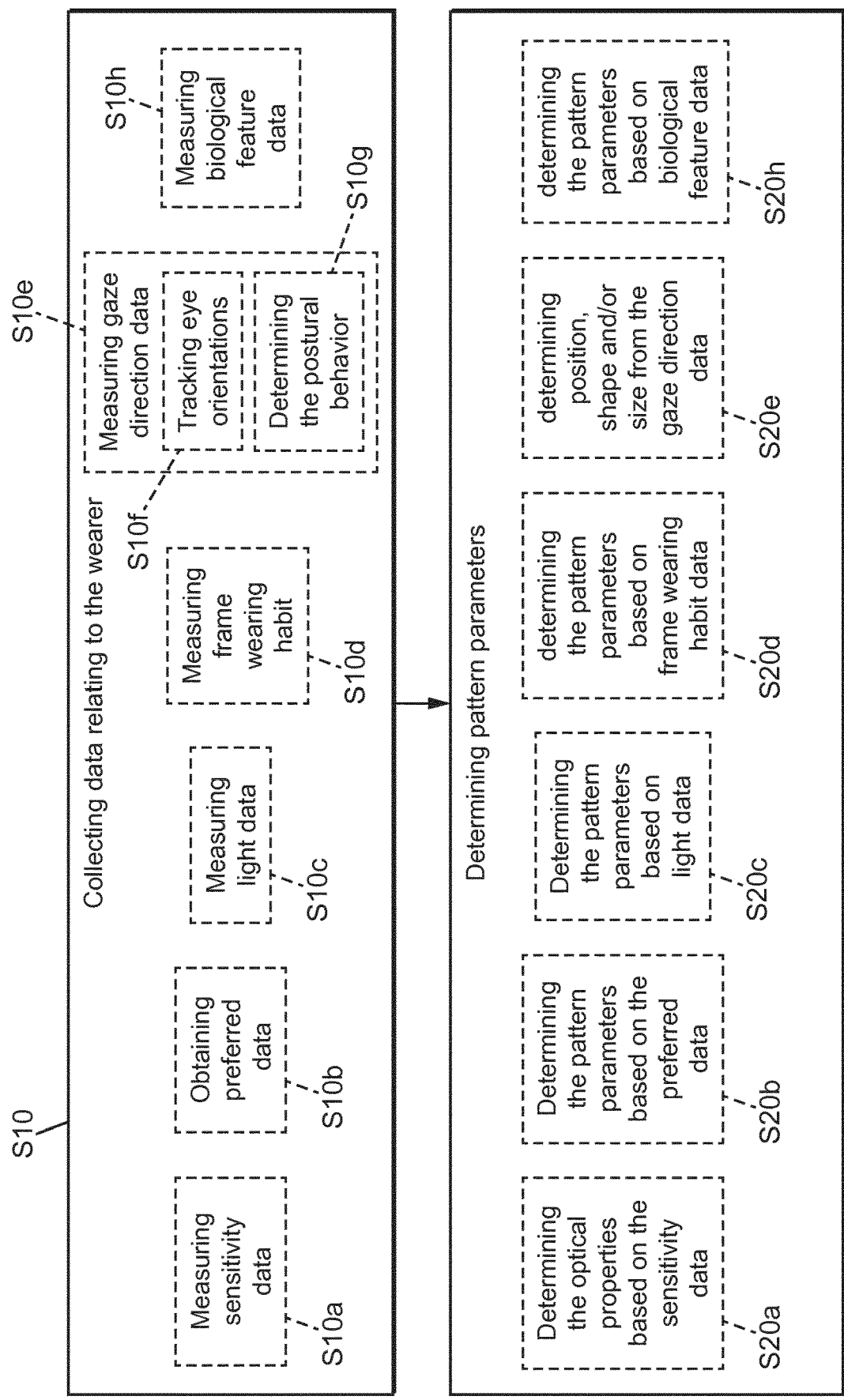
FIG. 3 is a flow chart illustrating different examples of how the different steps of the method may be performed in a general manner.

Some examples of how step S10 of collecting data relating to the wearer and how the step S20 of determining the pattern parameters based on the data relating to the wearer may be performed are illustrated in reference to FIG. 3.

For example, collecting data relating to the wearer may comprise measuring the gaze direction of the wearer (step S10e) when the wearer is looking at a scene in a given situation, representative of an activity of the wearer when the wearer uses the ophthalmic lens, and/or the environment in which the wearer uses the ophthalmic lens. The gaze direction of the wearer may be measured by tracking the eye orientations of the wearer (step S10f) using an eye tracker; for example. The eye tracker is a device configured to measure eye positions and eye movements regarding the head of the wearer. The gaze direction may also be measured by determining the postural behavior of the wearer (step S10g) such as measuring the average tilt of the head of the wearer when the wearer performs a certain task, for example when looking at a digital device or when walking. Another example is filming the wearer performing a given task. The gaze direction may be derived from the average tilt of the head or an observation of the video sequence of the wearer performing the given task.

For example, the given activity is driving and the wearer may want ophthalmic lenses adapted therefor. The gaze direction of the wearer may be measured when the wearer is looking at a virtual scene representative of driving, the virtual scene showing for example a representation of the interior of a car with one or more of the instrument panel, the reflective dashboard, the rear mirror and the windshield through which the outside environment of the car may be seen. The virtual scene is implemented using a virtual reality environment. The gaze direction is then measured by tracking the eye orientations of the wearer with respect to his head when he is looking at the instrument panel or looking at the road through the windshield, for example. Alternatively, the gaze direction may be measured when the wearer is placed in the given situation, for example, when the activity is reading. In this case, the gaze direction is measured preferentially by tracking the eye orientation of the wearer (step S10f) and determining the postural behavior of the wearer (step S10g). For this type of activity, the head of the wearer is usually bent downwards. For other activities, such as driving, for example, or when the wearer is an elder person, the whole position of the body may be taken into account to determine the height and angle of the wearer's head in the given situation. The angle and position of the wearer's head may have an influence on the gaze direction of the wearer and thus on the zone of the ophthalmic lens that is used while performing the activity. Gaze directions are usually given by their degree of lowering and azimuth respective to a primary gaze direction in a frame whose origin is the center of rotation of the eye. The primary gaze direction corresponds to the situation in which the wearer is looking straight ahead when his head is in a normal position. When the head of the wearer is tilted, the primary gaze direction, which is one of the reference axes of the frame, is tilted by the same angle. Thus, the tilt of the head of the wearer may be considered when determining the gaze direction of the wearer. The position of the wearer's head, and more particularly the height of the head, may also have an influence on the gaze direction.

The gaze direction data may be used to determine the position, shape and/or size of the light-filtering zones (step S20e). In particular, using the gaze direction measurements, the intersection of the gaze direction with a surface of the ophthalmic lens, preferably the surface on which the light-filter will be provided, may be used to determine areas of the ophthalmic lens that are used while performing the activity. Thus, the position, shape and/or size of each light-filtering zones may be determined based on the intersection of the gaze direction with a surface of the ophthalmic lens.

Also, the frame wearing habits like vertex distance, pantoscopic tilt and wrap angle have an influence on the orientation of the ophthalmic lens relative to the head and eye of the wearer and thus on the determination of the position, shape and/or size of the light-filtering zones based on the measurements of the gaze direction (step S20e).

Furthermore, a frame wearing habit like the vertex distance, for instance, or the pantoscopic tilt and/or wrap angle, may have an influence on the amount of light reaching the eye from a given source of light in front of the wearer and the pattern parameters like the optical properties or the size of the light-filtering zones may be modified accordingly (step S20d).

Further, collecting data relating to the wearer (step S10) may comprise measuring sensitivity data on the wearer (step S10a).

The sensitivity of the wearer may be a sensitivity to at least part of the optical radiation spectrum, preferably a part of or the full visible radiation spectrum. Sensitivity data may thus relate to sensitivity to particular wavelengths (called spectral sensitivity), in which case the sensitivity may be measured as a function of the wavelength. Alternatively or additionally, sensitivity data may relate to sensitivity to one or more ranges of wavelengths (called light sensitivity), in which case, the sensitivity is measured for one or more particular wavelength ranges, preferably the full visible radiation spectrum.

The sensitivity data measured on the wearer may also be a sensitivity to particular light spatial distributions and/or to particular temporal aspects like light transitions.

For example, the sensitivity of the wearer to particular light spatial distributions may be measured using a smart eyewear that detects the position and direction of the coming light. In this case, the eyewear may thus comprise spatial light detectors. Based on those measurements, locally small zones of the smart lens which comprises electrochromic elements may be activated to tune the color of the small zones to reproduce the particular light spatial distributions, for example by preventing or enhancing their darkening depending on the electrochromic system used by the electrochromic elements used; and the reaction of the wearer may be observed or recorded.

The sensitivity to particular temporal aspects like light transitions are of particular relevance when temporal changes in the optical properties are considered, for example when photochromic or electrochromic elements are intended to be used. For example, some people might have difficulties to adapt to light temporal variations; it might thus be advantageous to measure the level of light transitions these people can accept. Photochromic or electrochromic elements that are able to adjust the light coming inside the eye so that the light temporal variations are attenuated to a level that is acceptable for the wearer may be used.

Thus, step S10 may comprise measuring sensitivity data, like the spectral and light sensitivity, the sensitivity of the wearer to particular light spatial distributions and/or to particular temporal aspects. In this case, determining the pattern parameters (step S20) may comprise determining the optical properties based on the measurements of the sensitivity on the wearer (step S20a). The optical properties may comprise information relative to transition time of the electrochromic or photochromic elements, when the sensitivity to temporal aspects is considered, or information concerning control commands of the electrochromic elements, when the sensitivity to particular light spatial transitions is considered, for example.

Collecting data relating to the wearer (step S10) may comprise measuring light data corresponding to the light received by the wearer in the given situation (step S10c).

The light received by the wearer's eye in the given situation representative of the activity of the wearer and/or the environment may also be measured so that the optical properties of the light-filter pattern may be chosen to limit the amount of light that is received by the wearer's eye. In this case, determining the pattern parameters (step S20) may comprise determining the optical properties based on light data corresponding to the light received by the wearer's eye in the given situation (step S20c).

Collecting data relating to the wearer (step S10) may comprise obtaining preferred data (step S10b). Preferred data may be obtained by submitting, for example, different pattern parameters to the appreciation of the wearer by means of a test of one or more lenses having different light-filter pattern from different pattern parameters or different combinations thereof. Preferred data may also be obtained by simulating light-filter pattern from the different pattern parameters of different combinations thereof using a virtual reality headset. The wearer may then express a preference for at least one of the pattern parameters or combination thereof, like the position of the light-filtering zones or the optical properties, or for a particular personalized filter pattern. The virtual reality headset may also be used to simulate one or more particular environments in which the ophthalmic lens is intended to be used. In this case, determining the pattern parameters (step S20) may comprise determining the pattern parameters based on preferred data (step S20c).

In a particular embodiment, the different pattern parameters that are submitted to the appreciation of the wearer are the optical properties. The wearer may then express a preference for the optical properties of at least a particular light-filtering zone. Thus, step S20b comprises determining the optical properties based on preferred optical data.

Further, collecting data relating to the wearer (step S10) may also comprise measuring at least one biological feature data of an eye of the wearer (step S10h), the biological feature data being preferably at least one of macular size, pupil size and pupil distance, and determining the pattern parameters (step S20) may also comprise determining the pattern parameters based on the at least one biological feature data (step S20h).

For example, when the pupil size is large, it may be appropriate to provide a personalized light-filter pattern in which the size of the light-filtering zones is increased in comparison with a standard wearer to ensure that all the light passing through the pupil has met the light-filtering zones. Thus, efficiency of the light-filtering effect may be increased for the wearer.

Figure 4:
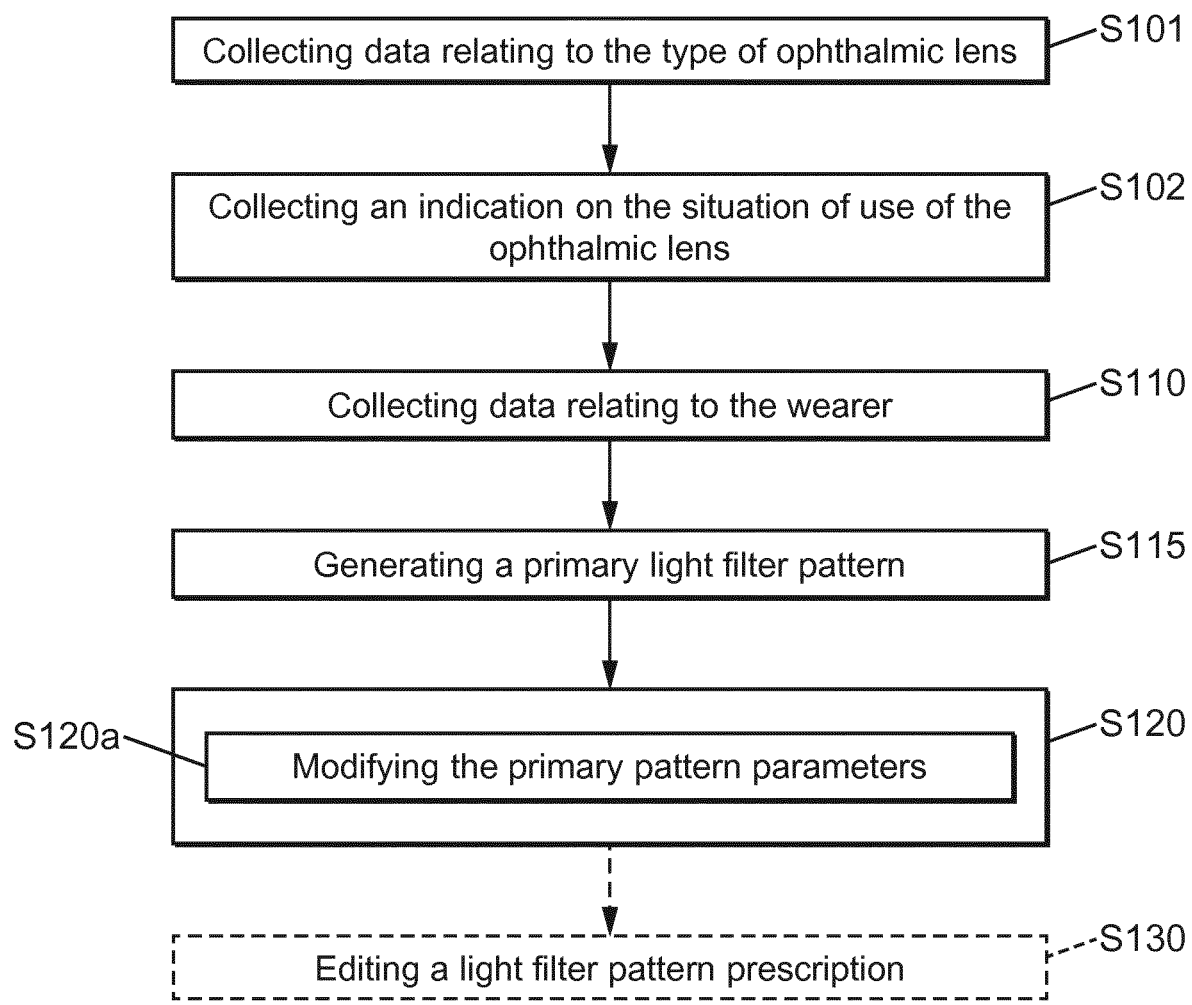
FIG. 4 is a flow chart showing the steps of a method for determining an ophthalmic lens with a personalized light-filter pattern comprising generating a primary filter pattern, according to an embodiment of the present invention.

FIG. 4 illustrates one particular embodiment of the method for determining an ophthalmic lens with a personalized light-filter pattern in which a primary light-filter pattern is generated. In this embodiment, the method may further comprise collecting data relating to the type of ophthalmic lens (step S101), collecting an indication on the situation of use of the ophthalmic lens (step S102) and/or collecting data relating to the wearer (step S110). The method may further comprise generating a primary light-filter pattern with primary pattern parameters (step S115) and determining the personalized light-filter pattern (step S120) by modifying the primary pattern parameters (step S120a) based on the data relating to the wearer. The method may further comprise editing a light-filter pattern prescription (step S130).

Figure 5:
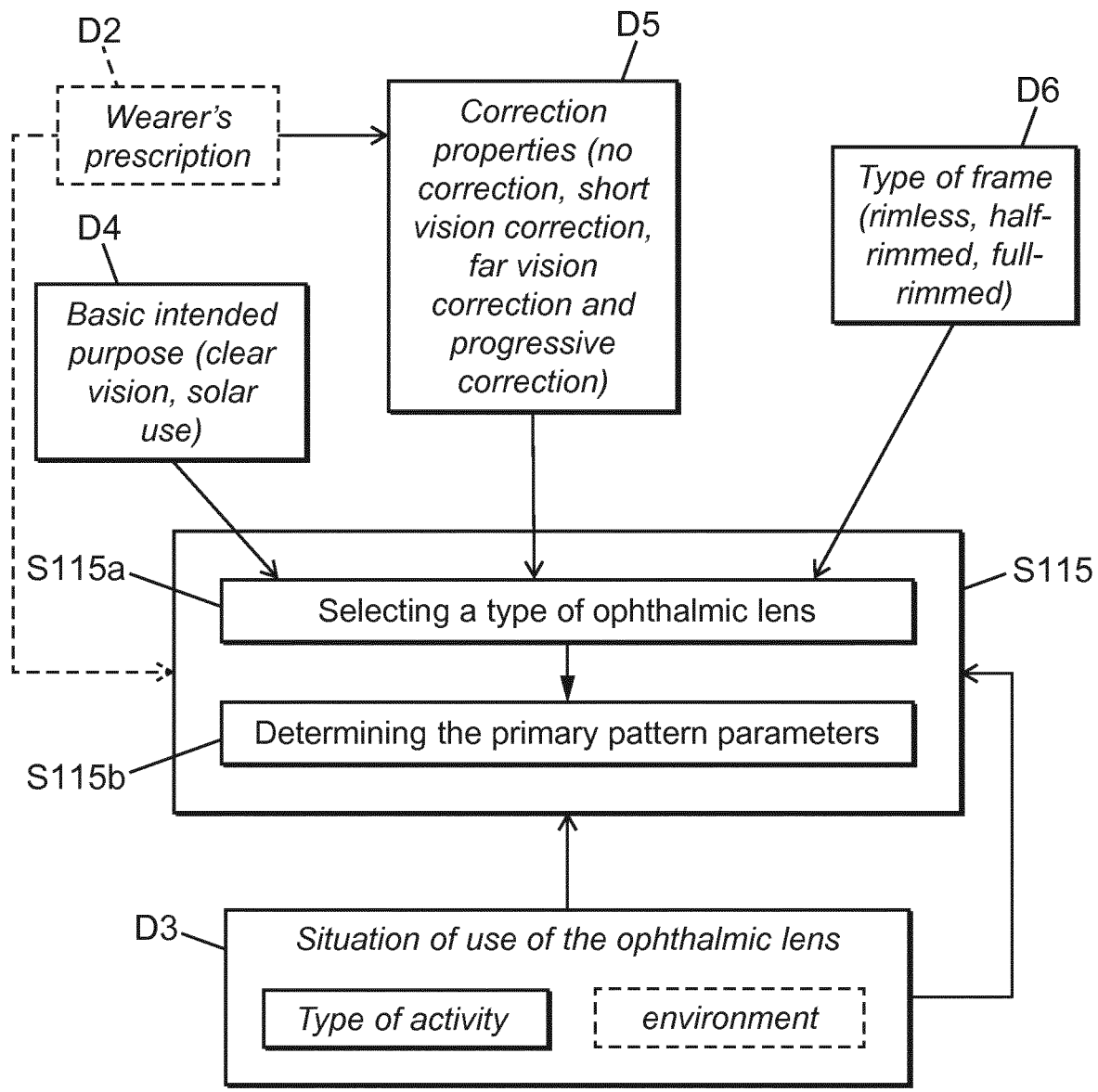
FIG. 5 is a flow chart showing the steps of generating the primary filter pattern.

FIG. 5 further illustrates step S115 in which the primary light-filter pattern may be generated. Step S115 may comprise selecting a type of ophthalmic lens (step S115a) based on the data collected in step S101 and determining the primary pattern parameters (step S115b) based on the activity of the wearer collected in step S102.

The data collected in step S101 may be the basic intended purpose D4 and/or the type of frame D6 and/or the wearer's prescription D2 if applicable. The wearer's prescription D2 may comprise the spherical power, the cylindrical power, the cylinder axis, and when applicable the prism, addition power and the like. The correction properties D5 may be deduced from the wearer's prescription and may correspond to no correction—when the wearer has no prescription—, short vision correction, far vision correction and progressive correction. The basic intended purpose D4 may be chosen amongst clear vision or solar use. The type of frame D6 may be chosen amongst rimless, half-rimmed and full-rimmed.

In step S102, an indication on the situation of use of the ophthalmic lens is collected. This indication D3 may comprise the type of activity (driving, sports, reading, indoor or outdoor activities) to perform using the ophthalmic lens and/or a particular environment (seaside, mountain, countryside and/or in the city) in which the ophthalmic lens is used. Both the type of activity and the particular environment may give indications on particular lighting conditions and/or particular characteristics of the scene.

In step S115a, the type of ophthalmic lens may be selected based on at least one of the following entry parameters: the basic intended purpose D4, the correction properties D5 and the type of frame D6. In some cases, the type of ophthalmic lens may also take into account the given situation in which it is intended to be used such as the activity and/or the environment. For example, when the ophthalmic lens is intended to be used for reading from a computer, a type of ophthalmic lens that is adapted for that situation may be selected. For example, a progressive lens or a short vision lens type particularly adapted for computer use may be selected . . . . The type of ophthalmic lens may also take into account a design of the correction properties, a type of tint or the frame size. In that case, the generation of the primary pattern parameters may be more accurate. For example, different types of designs of progressive lenses may be used for a same prescription. Thus, knowing the type of design used enables to determine the position, shape and size of particular viewing zones of the ophthalmic lens like the near field zone, far field zone and transition zone. The knowledge of the particular viewing zones may be used for determining the primary pattern parameters (step S115b).

In step S115b, the primary pattern parameters may be determined based on the type of ophthalmic lens D1 selected in step S115a, on the situation D3 and on the wearer's prescription D2 if applicable. The type of ophthalmic lens may be used to determine particular viewing zones of the ophthalmic lens in accordance with the situation. These particular viewing zones may be used for defining the approximate size and positions of the primary light-filtering zones. For example, when the activity is driving and the lens is a progressive lens, primary light-filtering zones may be provided within the far view field and the near view field. When the ophthalmic lens is a near vision lens and the activity is reading, at least one primary light-filtering zone may be provided within the near vision field. The frame size may also be taken into account for defining the approximate size and position of the primary light-filtering zones. Further, the number and position of the primary light-filtering zones may be defined according to the activity and/or to the environment. When the ophthalmic lens is to be used in an environment in which glare should be avoided, a light-filtering zone may be defined in the region where glare is believed to occur. For example, when the situation is driving at daylight, a polarizing light-filtering zone may be defined on areas of the ophthalmic lens through which the road and the reflective dashboard are to be seen by the wearer. The number and approximate position of the primary light-filtering zones may also be set depending on the tasks performed according to the activity. As an example, when the activity is driving, the primary light-filtering zones may correspond to the average positions of the rear mirror, side mirrors and the instrument panel as well as to the field of view of the wearer when he is looking at the road. The optical properties may also be provided with initial values indicative of a particular function to be fulfilled like contrast enhancement, filtering of LED car headlights, glare reduction, with an indication of a range of parameters that may be used. The parameters may be refined later using the spectral sensitivity data or preferred optical data for example.

Figure 6:
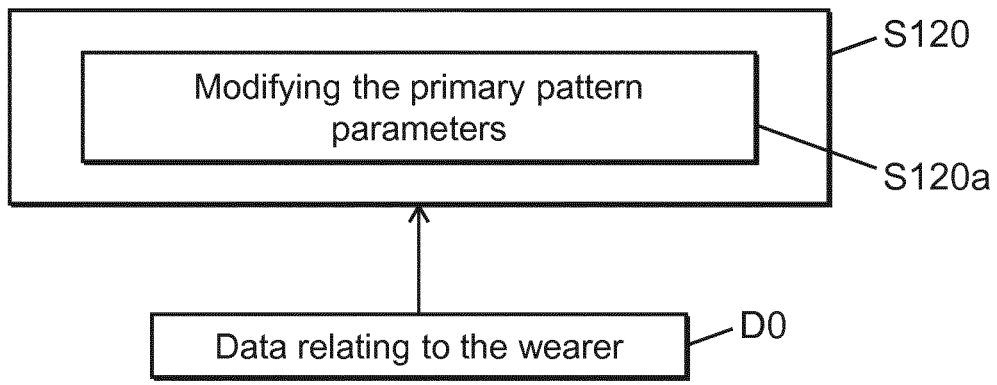
FIG. 6 is a flow chart showing the steps of determining the personalized light-filter pattern.

FIG. 6 illustrates step S120 in which the primary pattern parameters are modified (step S120a) based on the data relating to the wearer DO collected in step S110. The collected data relating to the wearer corresponds to the collected data relating to the wearer of step S10 that was previously described in reference to FIG. 3. The primary pattern parameters may be modified in a similar way as described previously at step S20 in reference to FIG. 3 also. For example, the position, shape and/or size of the primary light-filtering zones may be modified based on the gaze direction data measured in the given situation (step S20h). The optical properties may be modified based on measurements of sensitivity (steps S10a and S20a) or on obtained preferred optical data (steps S10b, S20b). The pattern parameters may be modified based on light data (step S20c), preferred data (step S20b), frame wearing habit (step S20d) and/or biological feature data (step S20h). In particular, the size of the light-filtering zones may be modified based on light data (step S20c), frame wearing habits (step S20d) and biological feature data (step S20h). The frame size may also be taken into account for modifying the size and position of the primary light-filtering zones.

In the following, some examples of personalized filter patterns are described.

EXAMPLE 1

Reading Outdoor at a Sunny Terrace Through a Pair of PAL

In step S115a, a clear progressive ophthalmic lens is selected based on the correction properties D5, deduced from the wearer's prescription D2 and on the type of frame D6.

In step S115b, a primary filter pattern comprising one primary light-filtering zone corresponding to the near view field is generated.

In step S120, the eye orientations and the postural behavior of the wearer are measured when the wearer is looking at a scene representative of the situation of reading at a sunny terrace. According to the measured gaze direction, the position and size of the primary light-filtering zone corresponding to the reading activity is modified. A new light-filtering zone corresponding to a zone of high light intensity in the center of the ophthalmic lens is created. The optical properties corresponding to particular color and transmission values of the light-filtering zones are set according to measurements of the spectral sensitivity and optionally of the light sensitivity. Alternatively, the optical properties may also be set according to measured preferred optical data.

EXAMPLE 2

A Progressive Ophthalmic Lens Adapted for New Progressive Lens Wearers or for Vision Stabilization In step S115a, a clear progressive lens defined by a design of the correction properties is selected based on the wearer's prescription D2 and the basic intended purpose D4.

In step S115b, a primary filter pattern comprising first, second and third light-filtering zones respectively corresponding to the far field zone, the near field zone and the transition zone, is generated based on the progressive lens design choice and the frame size. A fourth primary light-filtering zone corresponding to the zone outside of the first to third light-filtering zones is also generated. The optical properties of the first to third primary light-filtering zones are set to be at a predetermined value corresponding to a high transmission of light for all wavelengths. The optical properties of the fourth primary light-filtering zone is set to be at a predetermined value corresponding to a low transmission of light for all wavelengths. The fourth primary low transmission zone enables to prevent the wearer from looking through the fourth light-filtering zone.

In step S120, the eye orientation is measured when the wearer is performing the following tasks: looking into the near vision field, looking into the far vision field and moving the sight from near vision to far vision and the opposite direction. The size and shape of the corresponding first to third primary light-filtering zones are modified based on the eye orientation measurements.

EXAMPLE 3

Ophthalmic Lens Adapted for Night Driving

In step S115a, a type of ophthalmic lens is selected based on the basic intended purpose D4, the correction properties D5 and optionally, on the type and/or size of the frame, design of correction properties and a type of tint.

In step S115b, a primary filter comprising five primary light-filtering zones. The size, position and shape of each of the five primary light-filtering zones are determined based on the average positions of the view field of a standard population looking at the each of the two side mirrors, the rear mirror, the instrument panel and straight forward through the ophthalmic lens that is used when the wearer is looking at the road is generated, respectively.

In step S120, the wearer is seated in a car or is looking at a virtual scene representing the_environment of the car, for example using a virtual reality headset or a display. The wearer is asked to perform the five following tasks: look at the left side mirror, look at the right side mirror, look at the rear mirror, look at the instrument panel, look straight ahead. The eye orientations of the wearer are measured while the wearer is performing the different tasks. The size, shape and position of the five primary light-filtering zones are modified (step S120a) according to the gaze direction measurements. Then the postural behavior is measured and the position of each of the five primary light-filtering zones is modified to obtain the personalized light-filter pattern. Then, preferred data is measured based on a simulation of the personalized light-filter pattern generated using the gaze direction measurements. The different light-filtering zones are shown to the wearer with different preselected optical properties. In the light-filtering zones corresponding to the left and right side mirrors and to the rear mirror, tints with different colors and transmission values adapted for filtering the LED headlights of the other cars that may be seen through the mirrors are presented to the wearer. In the light-filtering zones corresponding to the center of the lens, tints with different colors and transmission values adapted to improve the contrast are presented to the wearer. If the wearer has indicated in step S102 while filling in a questionnaire that he usually performs another task while driving, for example turning on the radio, additional light-filtering zones may be added to the primary light-filter pattern to form the personalized light-filter pattern. The gaze directions of the wearer may also be measured when the wearer is performing the additional task as described previously and the position and size of the additional light-filtering zones may be set based on that measurement. Also, the preferred data for the additional light-filtering zone may be measured and the optical data of the additional light-filtering zones may be determined based on the measurement of the preferred data.

EXAMPLE 4

Ophthalmic Lens Adapted for Daylight Driving

In step S115a, a type of ophthalmic lens is selected based on the basic intended purpose D4, the correction properties D5 and optionally, on the type and/or size of the frame, design of correction properties.

In step S115b, a primary filter comprising two primary light-filtering zones are generated. The shape, size and position of the first primary light-filtering zone are determined based on the average position of the upper part of the scene corresponding to the viewing field through the windshield and to the reflective dashboard. The optical properties of the first primary light-filtering zone are set to correspond to a polarizing filter whose polarization axis is set to attenuate reflection on the road or on the reflective dashboard. The second primary light-filtering zone corresponds to the complementary part of the first primary light-filtering zone on the ophthalmic lens. The optical properties of the second primary light-filtering zone may be set to be transparent, i.e. with a high transmission value independently of the wavelength considered, or with a light polarization, i.e. with a polarization axis oriented substantially perpendicular to the polarization axis of the first primary light-filtering zone.

In step S120, the shape, size and position of the first primary light-filtering zone may be modified based on gaze direction measurements.

EXAMPLE 5

A Personalized Blue Light Filter Pattern for Computer-Based And Screen Activity Adapted to Enhance Contrast for a Near Reading Task In step S115a, a type of ophthalmic lens may be selected based on the basic intended purpose D4, the correction properties D5 and optionally, on the type and/or size of the frame, design of correction properties and a type of tint.

In step S115b, a primary light-filter pattern comprising three primary light-filtering zones corresponding to the average zone of the ophthalmic lens used when the wearer is looking at a computer (first primary light-filtering zone), at a TV screen (second primary light-filtering zone) and reading a piece of paper (third primary light-filtering zone), for example, is generated taking into account the frame size and the type of ophthalmic lens. The optical properties of the three primary light-filtering zones are set with initial values so that the first and second primary light-filtering zone are set to filter blue light and the third light-filtering zone is set to enhance the contrast while the reader is reading. The second primary light-filtering zone is set to correspond to a lighter tint.

In step S120, the wearer is asked to sit in front of a computer and to perform the tasks which require looking at the computer screen, looking at the TV screen and reading from a piece of paper positioned on the desk of the wearer according to his habits. The eye orientations of the wearer while performing these different tasks are measured using an eye tracker. The postural behavior of the wearer may also be measured. According to the gaze direction measurements, the size, shape and position of the three primary light-filtering zones may be modified based on the gaze direction measurements. The size of the macular is also measured and the part of the macular that should not be subjected to noxious blue light radiation within the range of 420 to 450 nm is determined. The size of the first and second primary light-filtering zone may be modified based on the size of the macular that should not be subjected to blue light radiation. The personalized light filter-pattern is then submitted to the wearer via a simulation of the personalized light-filter pattern and the wearer may give indications on whether the optical properties of the light-filtering zones should be modified.

EXAMPLE 6

Personalized Light-Filter Pattern with a Personalized Gradient Tint

In step S115a, a clear lens with no correction is selected.

In step S115b, a primary light-filter pattern comprising three primary light-filtering zones is generated. The first primary light-filtering zone corresponds to a zone having low transmission, the second primary light-filtering zone corresponds to a zone having high transmission and the third primary light-filtering zone is positioned between the first and the second primary light-filtering zones and has a gradient of tint starting from the same tint as the first primary light-filtering zone at the limit therewith and ending at same tint as the second primary light-filtering zone at the limit therewith. The position and size of the primary light-filtering zones are set with initial values corresponding to near vision, far vision and intermediate vision, respectively.

In step S120, the primary light-filter patterns may be modified based on gaze measurement data while reading, using the near vision field, while looking straight away, using the far vision field and while walking or going down the stairs, using intermediate vision. Also, the frame wearing habits, the preferred data, and so on, as described earlier in reference to step S20. Preferentially, the parameters of the third primary light-filtering zone may be modified to enhance the visual comfort of the wearer in the intermediate vision while he is performing an activity in the intermediate vision field, like walking or going down the stairs for example.

When a progressive lens is considered, the first, second and third primary light-filter patterns correspond to the far vision, near vision and intermediate vision zones. The primary light-filter pattern may be modified as described previously.

Figure 7:
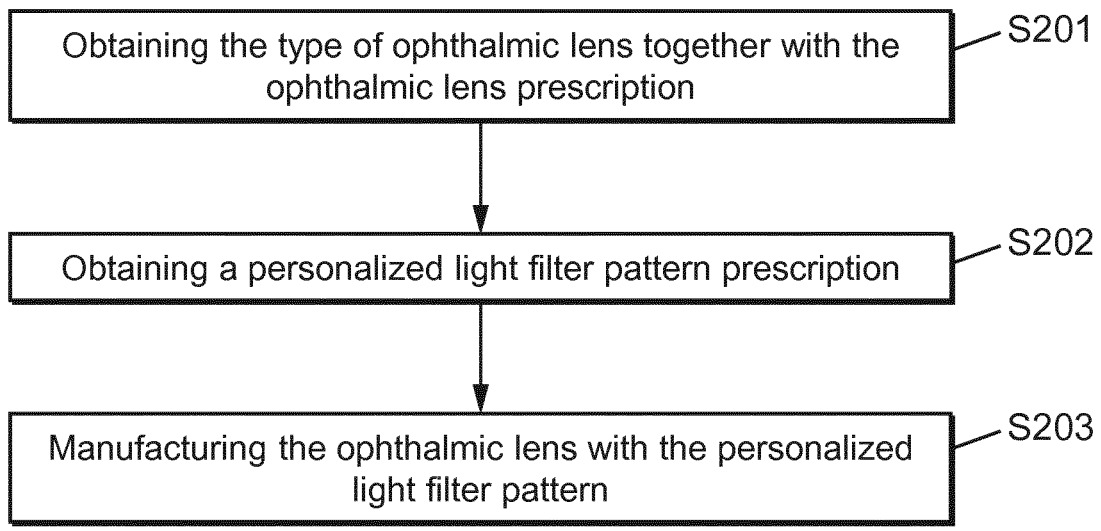
FIG. 7 is a flow chart showing the steps of a method for manufacturing an ophthalmic lens for a wearer with a personalized light-filter pattern, according to the invention.

FIG. 7 illustrates an exemplary method for manufacturing an ophthalmic lens with a personalized light-filter pattern, according to the invention. The manufacturing method comprises obtaining the type of ophthalmic lens with the ophthalmic lens prescription (S201), obtaining a personalized light-filter pattern prescription (S202) and manufacturing an ophthalmic lens with the personalized light-filter pattern (S203) corresponding to the type of ophthalmic lens with the lens prescription and to the light-filter pattern prescription.

In a variant of the present embodiment, obtaining the type of ophthalmic lens with the ophthalmic lens prescription (step S201) comprises obtaining the type of ophthalmic lens and obtaining the ophthalmic lens prescription when the type of ophthalmic lens is defined by at least one of the correction properties, the basic intended purpose and the type of frame.

In another variant of the present embodiment, obtaining the type of ophthalmic lens with the ophthalmic lens prescription (step S201) comprises obtaining the type of ophthalmic lens, when the type of ophthalmic lens is further defined by a design of the correction properties.

In a variant of the present embodiment, the manufacturing of the ophthalmic lens with the personalized light-filter pattern (step S203) comprises manufacturing the ophthalmic lens and subsequently, manufacturing the personalized light-filter pattern.

For example, layers of organic and inorganic materials are deposited on the surface of the polished lens to form an interference filter. Thus, the manufacturing of the ophthalmic lens comprises selecting the material, the manufacturing method and the manufacturing parameters based on the ophthalmic lens prescription and the type of ophthalmic lens to be manufactured. The manufacturing of the light-filter pattern comprises selecting the material and the manufacturing method and parameters for the at least one light-filtering zone of the personalized light-filter pattern based on the personalized light-filter pattern prescription. For example, the light-filtering zones may be manufactured by tinting, Nidek sublimation tinting, printing, Rolic technology or a combination of the former.

In addition, the manufacturing of the ophthalmic lens with the personalized light-filter pattern (S203) may comprise selecting the material, the manufacturing method and the manufacturing parameters based on the type of ophthalmic lens and on the ophthalmic lens prescription and on the personalized light-filter pattern prescription.

Such a manufacturing method may be used if it is determined that the ophthalmic lens should comprise light-filtering zones made of a different material than the ophthalmic lens, like, for example, colored glass, polarized glass, or a glass containing photochromic or electrochromic elements.

The invention claimed is:

1. A method for determining an ophthalmic lens for a wearer with a personalized light-filter pattern defined by pattern parameters, wherein the method comprises collecting data relating to the wearer and determining the pattern parameters based on the data relating to the wearer, wherein collecting data relating to the wearer and determining the pattern parameters comprises one or more of the following:
    measuring sensitivity data on the wearer to at least one part of an optical radiation spectrum, and determining the pattern parameters comprises determining an optical property is at least partially based on the sensitivity data;
    obtaining preferred data from the wearer by:
        submitting different pattern parameters to the wearer by means of a test of one or more lenses having different pattern obtained from the light pattern parameters; or
        simulating the different pattern parameters or one or more particular environments in which the ophthalmic lens is intended to be used, using a virtual reality headset, having the wearer expressing a preference for at least one of the pattern parameters; and
    determining the pattern parameters is at least partially based on the preferred data;

measuring light data corresponding to light received by the wearer in a given situation, and determining the pattern parameters is at least partially based on light data;

measuring at least one biological feature data of an eye of the wearer and determining the pattern parameters is at least partially based on the at least one biological feature data; and measuring at least one frame wearing habit data of the wearer and determining the pattern parameters is at least partially based on the at least one frame wearing habit data.

2. The method of claim 1, wherein the personalized light-filter pattern comprises at least one light-filtering zone, and wherein the pattern parameters comprise at least one of a position, a shape, a size, and an optical property of the at least one light-filtering zone.

3. The method of claim 1, wherein the data relating to the wearer comprises at least one of data relating to behavior of the wearer during a given activity, data relating to a preference of the wearer, or data relating to an environment of the wearer.

4. The method of claim 1, wherein the optical properties include at least one of light transmission, light absorption, light reflection or light polarization over at least one part of the optical radiation spectrum.

5. The method of claim 3, wherein the pattern parameters comprise at least one of position, shape or size of the at least one light-filtering zone of the personalized light-filter pattern, and wherein collecting data relating to the wearer comprises measuring gaze direction data of the wearer when the wearer is looking at a scene in a given situation, and wherein determining the pattern parameters comprises determining the at least one of position, shape and size of the at least one light-filtering zone from the gaze direction data.

6. The method according to claim 2, further comprising generating a primary light-filter pattern with primary pattern parameters based on a type of ophthalmic lens and a given situation representative of an activity of the wearer when the wearer uses the ophthalmic lens, and/or an environment in which the wearer uses the ophthalmic lens and a prescription of the wearer, if applicable, and wherein determining the personalized light-filter pattern comprises modifying the primary pattern parameters based on the data relating to the wearer.

7. The method of claim 6, wherein generating a primary light-filter pattern comprises:

selecting a type of ophthalmic lens defined by at least one of a correction property, a basic intended purpose and a type of frame;

wherein the correction property is at least one of no correction, short vision correction, far vision correction or progressive correction; and wherein the basic intended purpose is clear vision or solar use; and wherein the type of frame is rimless, half-rimmed, or full-rimmed.

8. The method of claim 1, further comprising editing a light-filter pattern prescription based on the pattern parameters.

9. A method for manufacturing an ophthalmic lens with a personalized light-filter pattern, comprising manufacturing the ophthalmic lens based on the light-filter pattern prescription edited according to the method of claim 8.

10. A computer program comprising one or more stored sequence(s) of instructions that is accessible to a processor and which, when executed by the processor, causes the processor to carry out at least one step consisting of collecting data relating to the wearer and/or determining the pattern parameters based on the data relating to the wearer of the method according to claim 1.

11. The method of claim 1, wherein the at least one biological feature data is at least one of a macular size, a pupil size or a pupil distance.

12. The method of claim 1, wherein the at least one frame wearing habit data is at least one of a vertex distance, a pantoscopic tilt or a wrap angle of the frame.

13. The method of claim 4, wherein the pattern parameters comprise at least one of position, shape and size of the at least one light-filtering zone of the personalized light-filter pattern, and wherein collecting data relating to the wearer comprises measuring gaze direction data of the wearer when the wearer is looking at a scene in a given situation, and wherein determining the pattern parameters comprises determining the at least one of position, shape and size of the at least one light-filtering zone from the gaze direction data.

* * * * *